Patented Feb. 13, 1951

2,541,074

UNITED STATES PATENT OFFICE 2,541,074

PREPARATION OF DERIVATIVES OF 3(a)-HYDROXYCHOLANIC ACID

Edward C. Kendall, Rochester, Minn., assignor to Research Corporation, New York, N. Y., a corporation of New York No Drawing. Application March 8, 1946, Serial No. 653,176

8 Claims. (Cl. 260—239.55)

This invention relates to the production of 3,9-epoxy steroid compounds of the formula

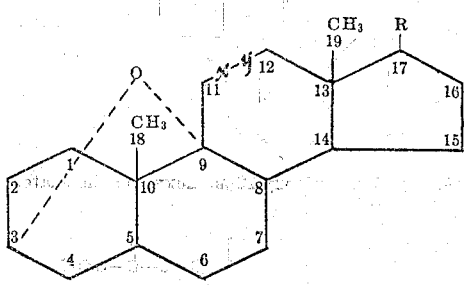

in which —x—y— represents a member of the group consisting of

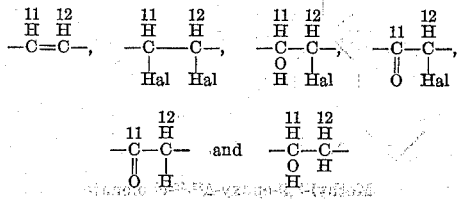

and R represents hydrogen or a monovalent group.

In the above formula the hydrogens attached to the carbons in positions 1 to 17 are omitted. All substituents shown at the 3-position, that is hydroxyl, acetoxyl, benzoxyl, etc. are in the 3(a) position as is the hydroxyl group in desoxychloic acid.

An object of the invention is the production of the 3,9-epoxy steroid compounds from 3(a),12-substituted steroids, as intermediates in the production of $C_3$-substituted steroids with a keto or hydroxyl group at $C_{11}$.

The invention will be illustrated with reference to the preparation of methyl-3,9-epoxy-11-ketocholanate, a compound of the above formula, in which the —x—y— position is occupied by the group

and in which position R is occupied by the group

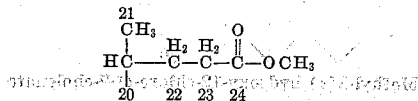

An outline of the process for the preparation of this compound is shown by the following flow sheet:

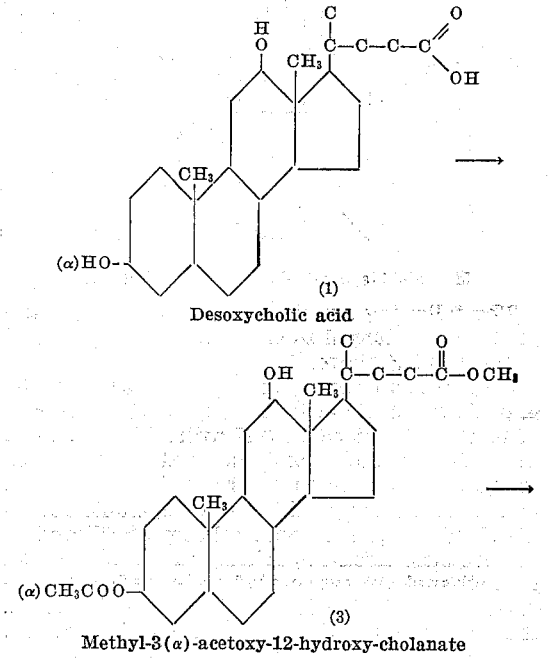

Desoxycholic acid (1)

Methyl-3(a)-acetoxy-12-hydroxy-cholanate (3)

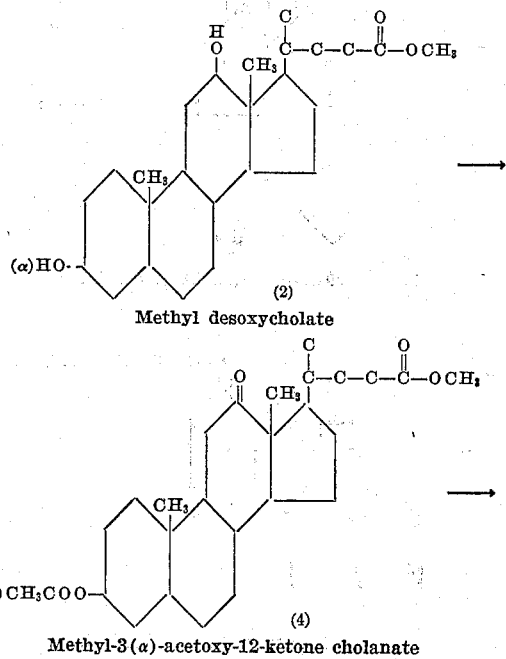

Methyl desoxycholate (2)

Methyl-3(a)-acetoxy-12-ketone cholanate (4)

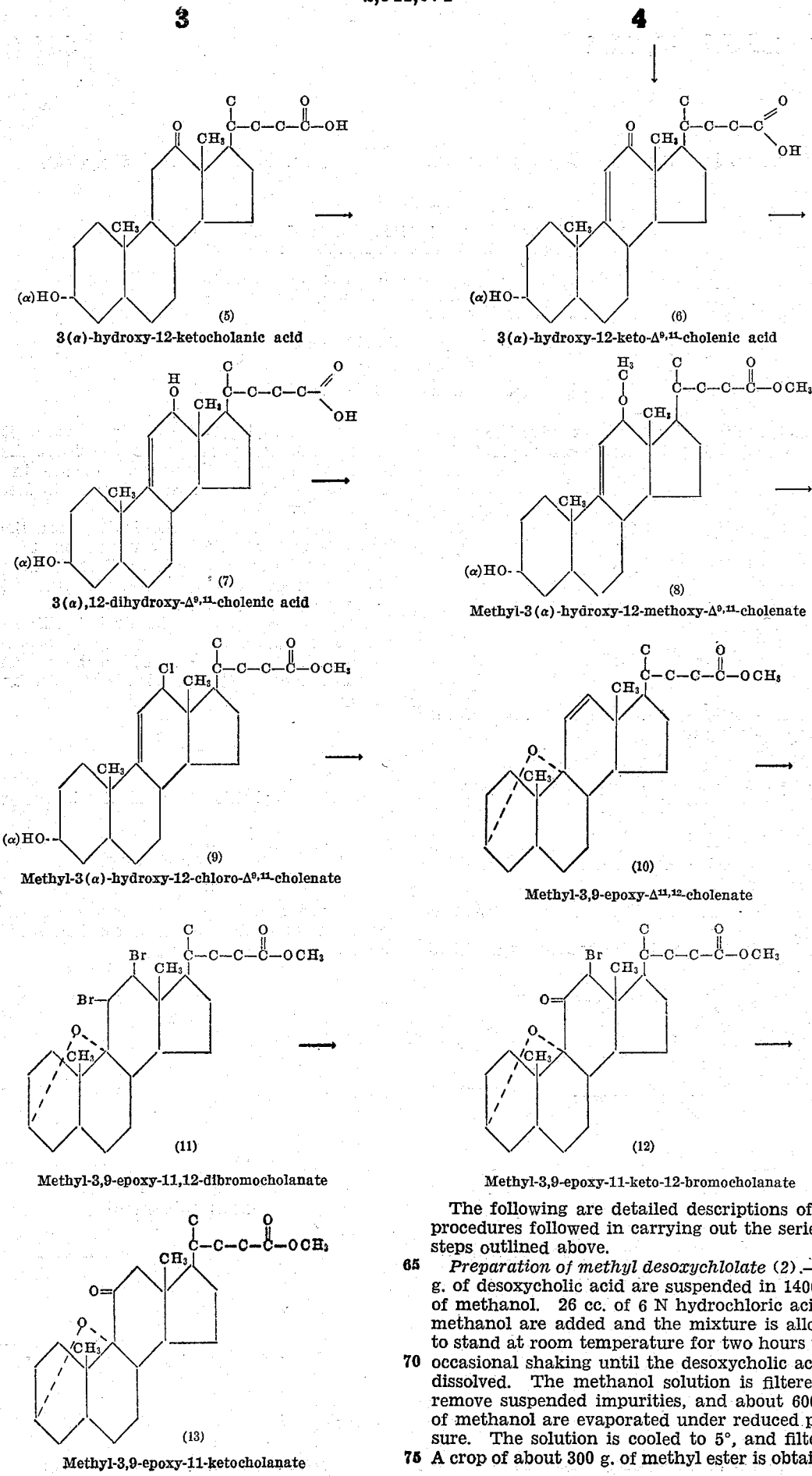

The following are detailed descriptions of the procedures followed in carrying out the series of steps outlined above.

*Preparation of methyl desoxychlolate (2).*—450 g. of desoxycholic acid are suspended in 1400 cc. of methanol. 26 cc. of 6 N hydrochloric acid in methanol are added and the mixture is allowed to stand at room temperature for two hours with occasional shaking until the desoxycholic acid is dissolved. The methanol solution is filtered to remove suspended impurities, and about 600 cc. of methanol are evaporated under reduced pressure. The solution is cooled to 5°, and filtered. A crop of about 300 g. of methyl ester is obtained.

The filtrate is evaporated to about 300 cc. On filtration about 125 g. of the methyl ester is obtained. Further evaporation and dilution with water yields a third crop, which after recrystallization from methanol weights about 20 g. Total yield is 440–450 g. The crystals separate from the solution combined with 0.5 mole of methanol per mole of ester. If the desoxycholic acid is pure the yield is almost quantitative.

*Preparation of methyl-3(a)-acetoxy-12-hydroxycholanate (3).*—422 g. (1 mole) of the methyl desoxycholate are suspended in 1400 cc. of acetic acid and 35 cc. of 1.7 N hydrochloric acid in glacial acetic acid are added. The volume is made to 2000 cc. with glacial acetic acid. The concentration of HCl will be 0.03 N. The solution is allowed to stand at 17° C. for 6 days. The methyl-3(a)-acetoxy-12-hydroxycholanate is not separated but is used in solution for preparation of the 12-ketone derivative.

*Preparation of methyl-3(a)-acetoxy-12-ketocholanate (4).*—The solution of methyl-3(a)-acetoxy-12-hydroxycholanate is maintained below 20° and is oxidized with 80 g. (120% of theory) of $CrO_3$ dissolved in 80 cc. of water+200 cc. acetic acid. The resulting mixture is allowed to stand at 20° C. for 1 hour. Four liters of water are added, the precipitated crystalline material is filtered from the solution and washed with water. The precipitate is dissolved in 2 liters of benzene and is stirred three times with 2 liters of water which contains 500 cc. of N HCl by means of a mechanical stirrer. The benzene solution is separated from the water and dried with sodium sulfate. The benzene is removed under reduced pressure.

*Preparation of 3(a)-hydroxy-12-ketocholanic acid (5).*—800 cc. of methanol are added to the methyl-3(a)-acetoxy-12-ketocholanate and the solution is boiled. 1000 cc. of 5 N sodium hydroxide are added slowly. The methanol is boiled off and water, to a volume of 3 liters, is added. This is allowed to cool to room temperature overnight. It is then filtered and the precipitate is washed with N sodium hydroxide. The precipitate is dissolved in 3 liters of warm water and is filtered from suspended impurities ($Cr(OH)_3$+lint). The solution is acidified with hydrochloric acid and the precipitated acid is filtered, washed by resuspension in water and again filtered. The residue is dried at 110°. The yield is about 375 g. (95–96%). M. P. 162–164°.

*Preparation of 3(a)-hydroxy-12-keto-$\Delta^{9,11}$-cholenic acid (6).*—The residue obtained from preparation (4) is dissolved in 3600 cc. of chlorobenzene and 900 cc. of acetic acid, 5 cc. of 1 N hydrogen chloride dissolved in acetic acid and 167 g. of selenium dioxide are added and the solution is boiled under a reflux condenser for 48 hours. The selenium which separates is removed by filtration and organic selenium compounds are oxidized by the addition of 20 g. of chromic acid in 200 cc. of water. The two phase system is vigorously stirred for 2 hours. The mixture is filtered and the chlorobenzene solution is washed with water to remove chromium salts and acetic acid. The chlorobenzene is removed under reduced pressure and the residue is dissolved in methanol, 110 cc. of 18 N sodium hydroxide are added and the solution is allowed to stand a few hours to hydrolyze the methyl ester and give the carboxyl group and to remove the acetyl group at position 3. The methanol is removed under reduced pressure, water is added to dissolve the sodium salt, the last traces of methanol are removed and the solution of the sodium salt of the acid is added to a flask which contains 3 liters of boiling water through which a rapid stream of steam is passed. A few crystals of 3(a)-hydroxy-12-keto-$\Delta^{9,11}$-cholenic acid and somewhat more than 2 moles of hydrochloric acid are added to the flask. The sodium salt of the cholenic acid is added slowly until the material separates in crystalline form. The alkaline solution can then be added rapidly; the cholenic acid separates as a voluminous precipitate. The solution is filtered hot and well washed with water. The acid is dried at room temperature or slightly above since traces of mineral acid may cause decomposition. The crude acid is dissolved in hot 80 percent acetone, 20 percent water in the proportion of 50 gm. of acid to 100 cc. of the acetone-water mixture. After the crude acid has dissolved the solution is placed in an ice bath for the separation of the cholenic acid. Successive crops may be separated by concentration of the mother liquor. M. P. 177°–178°, yield 90+ percent.

In the above process, the 3(a)-hydroxyl group may be protected by an aliphatic or aromatic acyl group which is stable to chromic acid. For example, the benzoyl group may be used instead of the acetyl group. The half ester of succinic acid or of phthalic acid also would be satisfactory.

*Preparation of 3(a),12-dihydroxy-$\Delta^{9,11}$-cholenic acid (7).*—3(a)-hydroxy-12-keto-$\Delta^{9,11}$-cholenic acid (6) is esterified in methanol which contains 0.1 N hydrochloric acid as described for the preparation of methyl desoxycholate (2). 120.6 g. (0.3 mole) of the ester are dissolved in a mixture of 300 cc. of ethanol and 300 cc. of acetic acid. 1.0 g. of Adam's platinum oxide is added and the flask is shaken in an atmosphere of hydrogen until one molar equivalent has been absorbed at which time utilization of hydrogen almost ceases.

The ethanol and acetic acid are removed under reduced pressure and the residue is dissolved in benzene or other organic solvent immiscible with water. The last traces of acetic acid are extracted with water and the benzene is removed under reduced pressure. The residue is crude methyl 3(a),12-dihydroxy-$\Delta^{9,11}$-cholenate.

The 3,12 diacetyl derivative of this crude product is prepared in acetic anhydride and pyridine. This compound is crystallized from methanol and when so purified the methyl ester and the acetyl groups are removed with sodium hydroxide in methanol to give 3(a),12-dihydroxy-$\Delta^{9,11}$-cholenic acid (7).

For preparation of (8) the residue of crude methyl ester is used.

*Preparation of methyl-3(a)-hydroxy-12-methoxy-$\Delta^{9,11}$-cholenate (8).*—To the residue from the preceding preparation 500 cc. of methanol, 50 cc. of concentrated aqueous hydrochloric acid and 58 cc. of water are added. The solution is allowed to stand at 5°. Crystals slowly separate and several successive crops may be secured. M. P. 158–160°. $[a]D = +130°$ (1% in methanol). The yield is 90+ per cent.

*Preparation of methyl-3(a)-hydroxy-12-chloro-$\Delta^{9,11}$-cholenate (9).*—83.6 g. (0.2 mole) of the preceding preparation are dissolved in 400 cc. of alcohol-free chloroform in a round bottom flask. The solution is cooled to 5° in an ice bath and is vigorously stirred with 200 cc. of concentrated aqueous hydrochloric acid. The chloroform is separated and is stirred twice more with 200 cc. of concentrated hydrochloric acid. The stirring chloro compound can be separated in crystalline form from the chloroform; however, for the purposes of the preparation, the subsequent step is carried out immediately on the chloroform solution.

*Preparation of methyl 3,9-epoxy-$\Delta^{11,12}$-cholenate (10).*—The chloroform solution from the preceding step is placed in a 3 or 5 liter flask with 1000 cc. of water which contains 100 g. of sodium bicarbonate and the contents of the flask are stirred mechanically for 15–18 hours. During this treatment hydrogen chloride is removed from the molecule and the cyclic ether 3,9 is formed with a shift in the double bond from position 9,11 to 11,12. The resulting 3,9-epoxy derivative of methyl-$\Delta^{11,12}$-cholenate can be separated in crystalline form but for the purposes of the preparation it is left in the solution of chloroform. The chloroform is concentrated to 250 cc. The yield is almost quantitative.

*Preparation of the free acid (compound 10A) from the methyl ester (compound 10).*—8 gm. of compound 10 are dissolved in 100 cc. of methanol with 20 cc. of 5 N sodium hydroxide. The methanol is evaporated under reduced pressure, the residue is diluted with 80 cc. of water and kept at 0° for some hours. A crystalline sodium salt separates and is washed with ice cold 1 N sodium hydroxide solution. The sodium salt is emulsified with a mixture of 100 cc. of water and 100 cc. of chloroform and acidified with 50 cc. of acetic acid. The chloroform is washed several times with water and evaporated to dryness. The mixture is dissolved in hot 95 per cent ethanol. Crystals separate after the solution is cooled to 0°. M. P. is 157–158°. $[\alpha]D = -51.6°$ (1% in methanol).

*Preparation of methyl 3,9-epoxy-11,12-dibromocholanate (11).*—The chloroform solution secured from preparation (10) is placed in a 500 cc. round bottom flask in the neck of which is a three-holed rubber stopper. Through one hole in the stopper is placed a short L glass tube to which is attached a short tube containing calcium chloride properly protected with a plug of cotton. The stem of a 250 cc. separatory funnel is placed in the second hole of the stopper. Through the third hole in the rubber stopper one end of a long glass U tube is placed so that it will extend to the bottom of the chloroform solution. The other end of the long glass U tube passes through a two-hole rubber stopper and terminates in a 1 liter round bottom glass flask. The remaining hole in the rubber stopper of the 1 liter flask is attached to another calcium chloride tube which is connected with a source of vacuum. In the 1 liter flask 350 cc. of dry alcohol-free chloroform and 20.6 cc. of bromine are placed. The two flasks are placed in two large beakers which are protected by insulation so that water does not condense on the outside surfaces. Solid carbon dioxide is placed in the two beakers and acetone is poured on it. In this way the temperature of the chloroform solution may be reduced to —78°. After the flasks have been cooled to —40° to —50° the chloroform solution containing the derivative of cholenic acid is drawn over by application of vacuum into the 1 liter flask which contains the chloroform and bromine. This step is carried out slowly and the total volume of chloroform is added in three portions, approximately one-third at a time. A short interval is allowed to lapse between additions to permit the temperature to be maintained at approximately —50°. A small amount of heat is produced by adding bromine to the double bond. This is indicated by an increased rate of bubbling of the carbon dioxide through the acetone. 50 cc. of chloroform are then added through the separatory funnel of the 500 cc. flask and after it is cooled to —50° it is drawn over into the 1 liter flask containing the bromine. This is followed by two additional 50 cc. portions of chloroform. The bromination is allowed to proceed for 30 minutes. The apparatus is then disconnected and the 1 liter flask which contains the reaction mixture is allowed to warm up until the chloroform which has frozen melts. The chloroform is then poured into a 4 liter beaker which contains 1700 cc. of water in which are dissolved 35 g. of sodium sulfite and 35 g. of sodium bicarbonate. The beaker is placed under a mechanical stirrer and is stirred for 30 minutes. The chloroform solution is separated and washed with distilled water. 250 cc. of methanol are then added and the mixture of chloroform and methanol is concentrated to about 225 cc. under reduced pressure or until crystals or a turbidity develops. If the solution becomes turbid, it is removed, diluted with 40 cc. of methanol and a few crystals of the dibromo derivative are added. This results in prompt formation of crystals through the solution. 460 cc. of methanol are added and the solution is allowed to stand at room temperature for ½ hour. It is then filtered and the separated crystals are washed with two 100 cc. portions of cold methanol. These crystals usually melt at 141.5–143° and weigh 65–70 g. (60 to 65 per cent of theory). The dibromo compound is purified by solution in a small volume of hot benzene to which warm methanol is added. Crystals soon separate and are filtered off after the solution has been cooled. The pure compound melts at 143°. $[\alpha]D = +52°$ (1% in chloroform).

The mother liquor of the crystals is seeded with the dibromo ester which melts at 123° and is concentrated under reduced pressure to about 200 cc. The crystals are washed with three 50 cc. portions of cold methanol and dried. The yield is 20 to 25 g. The melting point is usually 100–112°. These crystals are a mixture of two dibromo compounds which differ only in the spatial relationships of the bromine atoms at $C_{11,12}$. One of the components melts at 143° and the other at 123°. After about 0.2 mole of this mixture has been accumulated it is converted into methyl 3,9-epoxy-$\Delta^{11,12}$-cholenate through debromination and this is rebrominated precisely as described. For the debromination 119 g. of the mixture melting at 100–112° is dissolved in 230 cc. of boiling ether and 77 g. of powdered zinc are added. 770 cc. of methanol are added slowly with stirring and heating. The reaction mixture is heated in a 2 liter round bottom flask on the steam bath for fifteen minutes and cooled to room temperature. The zinc is filtered from the solution, methanol and remaining traces of ether are removed under reduced pressure to a volume of 200 cc. 500 cc. of chloroform are then added and the methanol is washed from the chloroform with eight successive 1 liter portions of water. It is best to filter the chloroform and water through a pad of infusorial earth after the first addition of water to the methanol and chloroform. The zinc salts which are present precipitate in part. After filtration, the chloroform may be washed with water without difficulty. After the methanol has been removed the chloroform solution is dried with sodium sulfate, concentrated under reduced pressure to about 250 cc. and is then brominated precisely as described.

*Preparation of methyl 3,9-epoxy-11-keto-12-bromocholanate (12).*—109 g. of methyl 3,9-epoxy-11,12-dibromocholanate is suspended in 2500 cc. of U. S. P. acetone in a flask equipped for mechanical stirring. The flask is placed in a water bath the temperature of which is maintained at 25° throughout the reaction. While the suspension is being stirred 50 g. of powdered silver chromate and a solution of 38.6 g. of chromium trioxide in 243 cc. of water are added in single portions. The temperature of the reaction mixture within the flask rises to about 30° within 5 minutes after addition of the silver chromate and chromium trioxide. The suspension is stirred mechanically until all of the crystals of the dibromo compound dissolve (1 to 2 hours) and is allowed to stand without stirring for 15 hours at 25°. 77 cc. of 5 N sulfuric acid are added with stirring and the suspension is stirred for thirty minutes. The solution is decanted from the inorganic salts and filtered. The residue is washed with two 100 cc. portions of acetone which are filtered and added to the main filtrate. The filtrate is concentrated under reduced pressure until crystals separate from solution. If the separation of crystals causes bumping, the crystals are removed and the concentration of the mother liquor is then continued until the volume of the solution is between 450 and 500 cc. (If the solution is concentrated to a smaller volume a gum separates and contaminates the product.) The crystals are filtered, washed well with water and dried. If the crystals are separated in two crops the first usually melts at 114-115° and the second at about 112–114°. The total yield is from 92–94 percent. $[\alpha]D= -32°$ (1% in chloroform).

*Preparation of methyl 3,9-epoxy-11-ketocholanate (13).*—14.4 g. (0.03 mole) of methyl 3,9-epoxy-11-keto-12-bromocholanate are dissolved in 200 cc. of glacial acetic acid and 15 g. of powdered zinc are added. The solution is stirred with a mechanical stirrer for 15–20 minutes at room temperature. The zinc is removed by filtration, the acetic acid is removed under reduced pressure, 100 cc. of benzene and 200 cc. of water are added and the benzene is then washed with water to remove acetic acid and zinc salts. The benzene is removed under reduced pressure and the methyl 3,9-epoxy-11-ketocholanate is crystallized from dilute methanol. M. P. 77–88°. $[\alpha]D=+88°$ (1% in chloroform).

All of the above compounds, derived from desoxycholic acid, contain the side chain thereof in 17-position. Compounds containing other substituents in the 17-position may be made, e. g. by the use of other 3($\alpha$),12-substituted steroid compounds or by the removal or shortening of the 17-side chain at the beginning or at some intermediate stage or at the end of the synthesis of compound 13 outlined above.

Degradation of the side chain attached to the carbon in 17-position to produce compounds in which the R of the general formula given at the beginning of this specification represents:

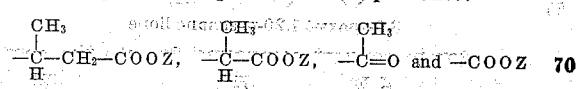

in which Z stands for hydrogen or an alkyl group is illustrated by the following.

The side chain may be degraded stepwise, one carbon at a time, by a method devised by Wieland and Barbier. Since this method is known it is unnecessary to describe it further than to state that the Grignard reaction using magnesium phenylbromide is employed to replace the ester groups and form the corresponding diphenyl carbinols, which latter are converted into the corresponding diphenylethylenes and these are oxidized to give diphenyl ketone and the acid on the side chain with one carbon atom less than in the starting compound. It may be noted, however, that the known Wieland and Barbier method is improved or gives improved yields if the Grignard reaction is carried out at a low temperature and for a longer time, e. g. at 0° C. for 24 hours instead of at high temperature for several hours. A further improvement in Wieland and Barbier method is to carry out the oxidation with chromic acid in the presence of acetic acid, chloroform and water the presence of which latter prevents formation of an oxide at the double bond and favors formation of the glycol which is easily oxidized to the next lower acid. A further improvement in the Wieland and Barbier method is the addition of sulfuric acid to the chromic acid used in the oxidation to form chromium sulfate from the reduced chromium instead of chromium acetate. For example, for the oxidation of 0.1 mole of the ethylene compound I may use a mixture of 155 cc. of chloroform, 100 cc. of 10 N chromic acid dissolved in a mixture of 85% acetic acid and 15% water and 100 cc. of 10 N sulfuric acid in a mixture of 85% acetic acid and 15% water. This same solution may be used for the oxidation of the first ethylene from cholanic acid and the second ethylene from the nor acid. Still another improvement in the Wieland and Barbier method is the use of a solvent such as ethyl morpholine to keep the intermediate product in solution during the formation of the diphenyl carbinol. This sequence of steps, starting with compound 12 and ending with compound 21, is shown in the following flow sheet:

Compound 12

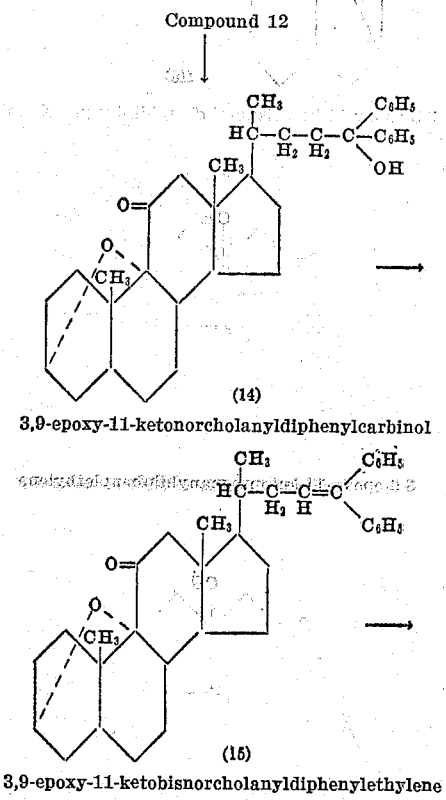

(14)
3,9-epoxy-11-ketonorcholanyldiphenylcarbinol

(15)
3,9-epoxy-11-ketobisnorcholanyldiphenylethylene

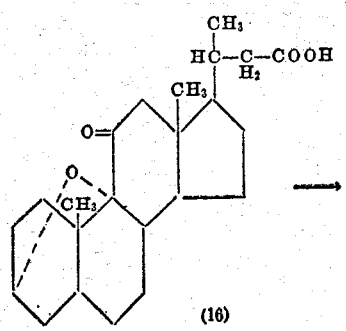

(16)

3,9-epoxy-11-ketonorcholanic acid

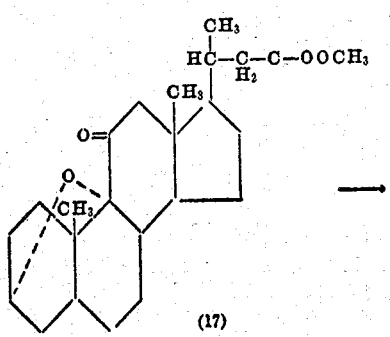

(17)

Methyl 3,9-epoxy-11-ketonorcholanate

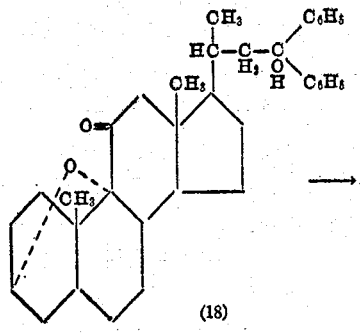

(18)

3,9-epoxy-11-ketobisnorcholanyldiphenylcarbinol

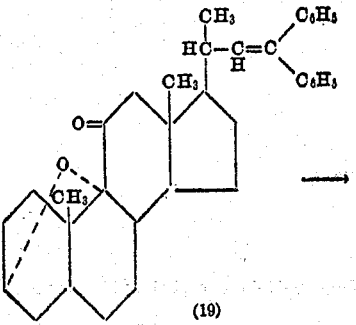

(19)

3,9-epoxy-11-ketopregnanyldiphenylethylene

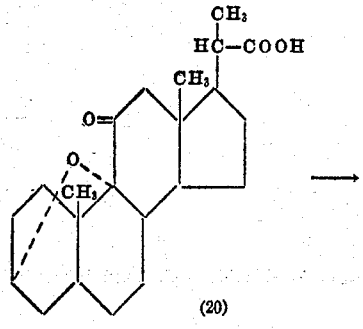

(20)

3,9-epoxy-11-ketobisnorcholanic acid

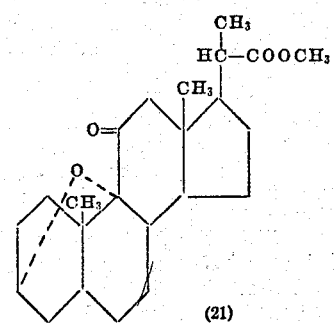

(21)

Methyl-3,9-epoxy-11-ketobisnorcholanate

In proceeding from compound 21 the degradation procedure is the same as above excepting that the oxidation is accomplished by means of ozone, instead of chromic acid, which breaks off the side chain attached to the 20-carbon and gives compound 24. This sequence of steps is represented by the following flow sheet:

Compound 21
↓

(22)

3,9-epoxy-11-ketopregnanyldiphenylcarbinol (23)

3,9-epoxy-11-ketomethyletiocholanyldiphenylethylene (24)

3,9-epoxy-11,20-pregnanedione

In order to convert compound 24 into the compound having the carboxyl group at position 17, compound 24 is treated with benzaldehyde in methanol and sodium methylate. This is a known type of reaction and yields compound 25 shown below. This benzal derivative is then treated with ozone which liberates benzaldehyde and forms an aldehyde group at the 21 carbon atom and the resulting compound upon treatment with periodic acid yields the etio acid compound 26 as follows:

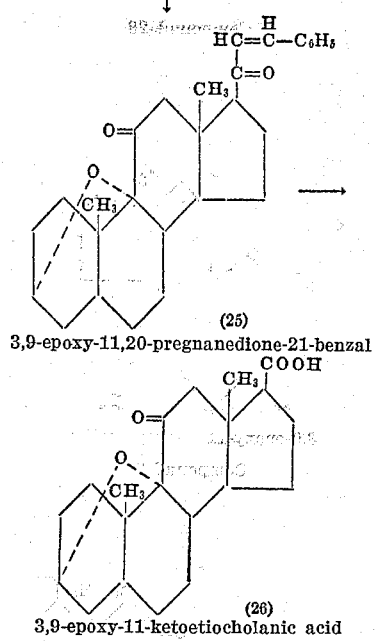

(25)
3,9-epoxy-11,20-pregnanedione-21-benzal

(26)
3,9-epoxy-11-ketoetiocholanic acid

The same treatment with benzaldehyde and sodium methylate can be applied to the 3(α)-hydroxy derivative after the epoxy structure has been opened. This gives 3(α)-hydroxy-11-ketoetiocholanic acid after ozonization of the 21 benzal intermediate and treatment with periodic acid. Also the side chain can be degraded with the 3(α)-hydroxy series of intermediates instead of the 3,9-epoxy compounds. The 3(α)-hydroxy group must be acetylated before oxidation with chromic acid in each case.

The methyl ester of compound 26 may be prepared by treating it at boiling point with methanol and mineral acid, for instance, sulfuric acid of 1% concentration.

Another method for removing three carbons of the side chain at C20 which is applicable to the 3,9-epoxy compounds referred to above as well as to the 3(α)-substituted 11-keto compounds, e. g. 3(α)-acetoxy-11-keto-12-bromobisnorcholanyldiphenylethylene is as follows. This method involves the formation of a compound with two double bonds in the side chain in positions 20–22 and 23–24, i. e. the diene compound, and may start with compound 15 or 29 which already have a double bond in the side chain at the 23–24 position. One method for the introduction of the second double bond in the side chain is to treat compound 15 in an organic solvent such as benzene, chlorobenzene, chloroform or carbon tetrachloride with selenium dioxide in the presence of pyridine. The result is the introduction of the hydroxyl group on the carbon in 22 position. The resulting compound 27 is then treated with a small amount of hydrobromic acid in acetic acid and the hydroxyl group is broken off as water to form the double bond at position 20–22 yielding compound 28.

Another method for the introduction of the second double bond in the side chain which is applicable generally to 3,9-epoxy and 3(α)-substituted-11-keto steroid compounds is by treating the diphenylethylene derivative, e. g. compound 29, with bromo succinimide in carbon tetrachloride. The reaction is catalyzed by exposure to light with wave lengths in the visible spectrum as by exposing the reaction mixture to the light from an ordinary electric light bulb for about 15 minutes. The resulting compound 30 containing bromine substituted on the 22-carbon is separated from the succinimide formed, which separates in the reaction mixture as an insoluble product, and may be converted into the diene compound 31 by refluxing in carbon tetrachloride or by heating with acetic acid and sodium acetate. A specific example of this procedure is as follows: Forty grams of 3(α)-acetoxy-11-keto-12-bromobisnorcholanyldiphenylethylene were heated to boiling in 400 cc. of carbon tetrachloride with 11.32 gm. of bromosuccinimide for 20 minutes over a 200 watt bulb. The solution was cooled, filtered, carbon tetrachloride was removed under reduced pressure, 400 cc. of acetic acid and 21 gm. of sodium acetate were added and the solution was heated to boiling for 30 minutes. The acetic acid was removed under reduced pressure and the residue was dissolved in benzene and washed with water. The benzene was removed to small volume, acetic acid added and the last traces of benzene were taken off under reduced pressure. Crystals separated from solution which were filtered and purified by treatment with 150 cc. of acetone at the boiling point. The solution was cooled in an ice bath and filtered. The crystals, M. P. 179–180°, were 3(α)-acetoxy-11-keto-12-bromo-24-diphenyl-$\Delta^{20,22:23,24}$-choladiene. The action of the bromosuccinimide was to introduce a bromine group at 22 and hydrobromic acid was removed between 20 and 22 through the action of sodium acetate in acetic acid.

For the oxidation of the diene (31), 5.8 gm. of the diene were dissolved in 55 cc. of acetic acid and 37 cc. of chloroform (free from alcohol), 9.2 cc. of water and 16.6 cc. of 10 N chromic acid in 85 per cent acetic acid and 15 per cent water were added to the solution cooled to 10°. After fifteen minutes 16.6 cc. of 10 N sulfuric acid in 85 per cent acetic acid and 15 per cent water were added and the solution was stirred mechanically one hour and forty-five minutes; the temperature was between 10–15°. The solution was diluted with water and extracted with chloroform. From the chloroform the 3(α)-acetoxy-12-bromo-11,20-pregnanedione was separated and crystallized from petroleum ether. M. P. 186.5–188°, yield about 65 per cent.

The two methods described above for forming the diene compounds are illustrated by the following flow sheet:

Compound 15

Selenium dioxide

(27)
3,9-epoxy-11-keto-22-hydroxy-24-diphenylbisnorcholanylethylene

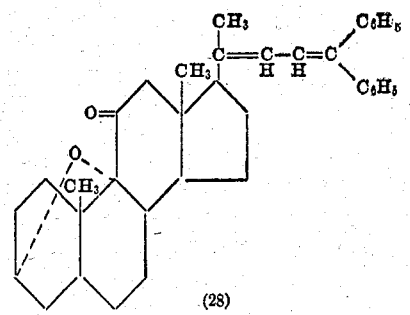

(28)
3,9-epoxy-11-keto-24-diphenyl-$\Delta^{20,22;23,24}$-choladiene

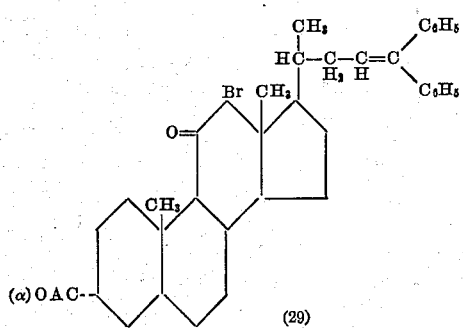

(29)
3($\alpha$)-acetoxy-11-keto-12-bromobisnorcholanyl-diphenylethylene

| Bromosuccinimide

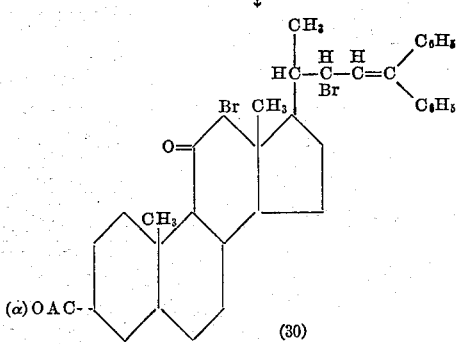

(30)
3($\alpha$)-acetoxy-11-keto-12,22-dibromobisnorcholanyl-diphenylethylene

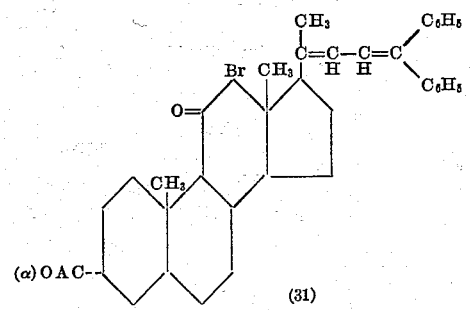

(31)
3($\alpha$)-acetoxy-11-keto-12-bromo-24-diphenyl-$\Delta^{20,22;23,24}$-choladiene The diene side chains of the compounds 28 and 31 may be removed by oxidation with chromic acid as described above which removes the whole side chain and forms the C$_{20}$ ketone. The 3,9-epoxy group in the one instance and the 3($\alpha$)-acetoxy group, the 11-keto group and the 12-bromine in the other instance remain unaltered. The respective products are compounds 24 and 32:

Compound 28
↓

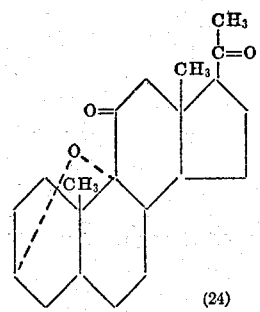

(24)
3,9-epoxy-11,20-pregnandione

Compound 31
↓

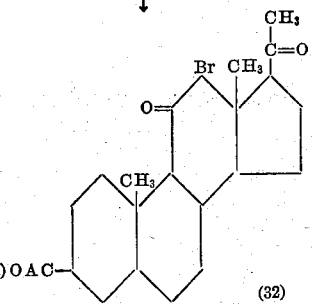

(32)
3($\alpha$)-acetoxy-12-bromo-11,20-pregnandione

The 3,9-epoxy group or structure may be opened either before or after removal of the C-20 side chain as described above. It has been found, however, that the ease with which the epoxy structure opens depends upon the length of the side chain. The longer is the side chain the more readily is the epoxy structure opened. It is preferred therefore to open the epoxy structure at the stage of compound 13 or compound 15. This process is illustrated by the following example:

*Preparation of methyl 3($\alpha$)-hydroxy-11-ketocholanate (35) from methyl 3,9-epoxy-11-ketocholanate (13).*—Twenty grams of methyl 3,9-epoxy-11-ketocholanate (13) are placed in a heavy walled glass pressure bottle. Twenty-five cc. of dry chloroform and 25 cc. of acetic anhydride are added and the flask is cooled in an acetone-Dry Ice bath to approximately —78°. Into the flask gaseous hydrobromic acid is passed until the weight of the flask is increased 100 gm. The flask is securely stoppered with a glass block and rubber ring and is placed in an ice bath. The temperature is maintained at 0° for twenty-four hours. The flask is again cooled in acetone and Dry Ice and when the temperature is approximately —78° the stopper is removed. At the temperature of Dry Ice the pressure in the bottle is approximately atmospheric pressure; at 0° the pressure increases to about 70 pounds per square inch. The contents of the flask are immediately poured into a beaker on cracked ice. Chloroform is added and the solution is well washed with water. The chloroform is concentrated to about 75 cc.; 500 cc. of methanol and 5 cc. of acetyl chloride are added. The hydrochloric acid liberated from the acetyl chloride in the presence of the methanol restores the methyl ester which may have been removed during treatment with hydrobromic acid. At the same time the methanolic hydrogen chloride removes the acetyl group at position 3 and forms the free hydroxyl group. Methanol is removed under reduced pressure. The residue is dissolved in chloroform or benzene and is washed with water to remove acid and methanol. Most of the solvent is removed and to the residue ligroin or petroleum ether is added. The methyl 3($\alpha$)-hydroxy-11-keto-12-bromocholanate (34) crystallizes from the solvent M. P. 154°. This bromo derivative is debrominated by solution in glacial acetic acid through the addition of zinc dust. The excess zinc is filtered from solution and the acetic acid is removed under reduced pressure. The residue is dissolved in benzene and washed with water; the benzene is dried and taken to a small volume. The ester is crystallized from ligroin. M. P. 100°. The free acid can be separated after hydrolysis of the methyl ester M. P. 186°

Compound 13
↓

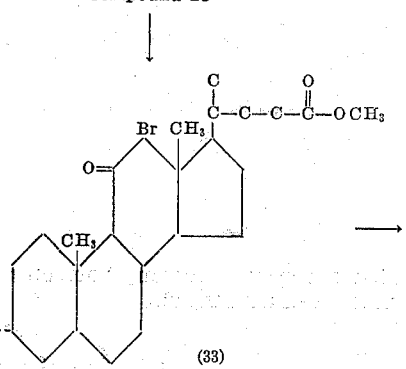

Methyl-3($\alpha$)-acetoxy-11-keto-12-bromo-cholanate

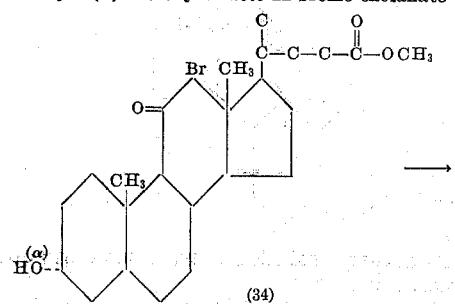

Methyl-3($\alpha$)-hydroxy-11-keto-12-bromo-cholanate

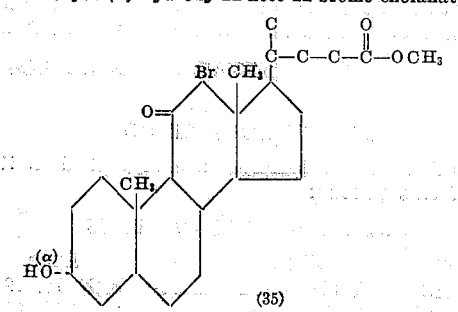

Methyl-3($\alpha$)-hydroxy-11-keto cholanate

This same method, using hydrobromic acid, is operable for opening the epoxy group of compound 15 and generally for opening the epoxy groups of 3,9-epoxy-11-keto-steroid compounds. The essential part of the reaction is to introduce sufficient halogen acid, in this case, hydrobromic acid, to bring about cleavage of the ether structure. Experience has shown that a high concentration of acid is required and I have secured this through the use of gaseous hydrogen bromide passed into a solution at such a temperature that the gas is condensed to liquid hydrobromic acid. It is not essential to use acetic anhydride in the reaction. This was done in the example given above to prepare the acetate ester at the 3-hydroxy group as rapidly as it was opened. The purpose of the acetylation at 3 was to diminish or block the introduction of bromine by substitution of the hydroxyl group at 3. Through the action of hydrobromic acid I have opened the epoxy structure in a chloroform solution alone without acetic anhydride. If the concentration of hydrobromic acid is too great, and if the solution is allowed to stand several days, the hydroxyl or acetyl group at 3 is replaced with bromine with formation of the 3,12-dibromo derivative.

An alternate method for the production of methyl-3,9-epoxy-$\Delta^{11,12}$-cholenate (10) is by starting with 3($\alpha$)-hydroxy-11,12-dibromocholanic acid, treating it with sodium hydroxide to the production of the 3($\alpha$),12-dihydroxy-$\Delta^{9,11}$-cholenic acid (7), esterifying the carboxyl group and forming the 12-methoxyl group by treating with methyl alcohol and mineral acid thereby forming methyl-3($\alpha$)-hydroxy-12-methoxy-$\Delta^{9,11}$-cholenate (8), replacing the methoxyl group by chlorine by treatment with hydrochloric acid thereby forming methyl-3($\alpha$)-hydroxy-12-chloro-$\Delta^{9,11}$-cholenate (9), and removing the hydrogen of the 3 hydroxy group and the 12 chlorine and thereby forming the methyl-3,9-epoxy-$\Delta^{11,12}$-cholenate (10) by treatment in chloroform and a solution of sodium bicarbonate or other base in water.

Referring to the conversion of compound 9 into compound 10 as described above, it is noted that the formation of compound 10 appears to be the result of an allylic shift occurring in compound 9 by which the halogen at $C_{12}$ is removed by solvation. The resulting carbonium ion is stabilized by loss of a proton from the hydroxyl group at $C_3$ to give halogen acid and the cyclic ether 3,9, with a double bond at $C_{11}$; $C_{12}$.

The reaction can be carried out otherwise than by the use of sodium bicarbonate as described. For example, if the 12-halogen compound (compound 9) is dissolved in chloroform and the chloroform solution is then washed with water, halogen acid is removed from the chloroform as fast as it is formed and the reaction will proceed in the case of the 12-bromo compound with great speed; in the case of the 12-chloro, it proceeds more slowly. The addition of any base such as sodium carbonate, sodium bicarbonate, sodium hydroxide or calcium carbonate will neutralize the acid as it is formed in the aqueous chloroform mixture. A very satisfactory alternate procedure is to dissolve the 12-halogen compound in chloroform and add pyridine. After several hours an excellent yield of the epoxy compound is secured.

I have prepared dehydrocorticosterone from the etio acid prepared by degradation of the 17-side chain of compound 35 to the etio acid, and then building up the two carbon side chain at position 17 by the method used by Reichstein for preparation of desoxycorticosterone. That is, 3($\alpha$)-acetoxy-11-ketoetiocholanic acid was converted into the acid chloride which latter was treated with diazo methane and then with potassium hydroxide to give 3($\alpha$)-hydroxy-21-diazo-11,20-pregnanedione. Acetic acid converted the $C_{21}$ diazo group to the $C_{21}$ acetoxyl group. Oxidation of the 3(α)-hydroxy group with chromic acid gave 21-acetoxy-3,11,20-pregnanetrione. Bromination at $C_4$ and dehydrobromination gave 21-acetoxy-$\Delta^{4,5}$-3,11,20 pregnentrione.

I claim:

1. As a new product a compound of the formula

[structure]

in which R stands for a member of the group consisting of $$H\overset{CH_3}{\underset{|}{C}}-CH_2-CH_2-\overset{O}{\overset{\|}{C}}-OX; \quad H\overset{CH_3}{\underset{|}{C}}-CH_2-\overset{O}{\overset{\|}{C}}-OX;$$

$$H\overset{CH_3}{\underset{|}{C}}-\overset{O}{\overset{\|}{C}}-OX; \quad and \quad \overset{O}{\overset{\|}{C}}-OX$$

in which X stands for a member of the group consisting of hydrogen and the lower alkyl groups.

2. As a new product a compound as defined in claim 1 in which R represents the group $$H\overset{CH_3}{\underset{|}{C}}-CH_2-CH_2-\overset{O}{\overset{\|}{C}}-OX$$

3. As a new product a compound as defined in claim 1 in which R represents the group $$H\overset{CH_3}{\underset{|}{C}}-CH_2-\overset{O}{\overset{\|}{C}}-OX$$

4. As a new product a compound as defined in claim 1 in which R represents the group $$H\overset{CH_3}{\underset{|}{C}}-\overset{O}{\overset{\|}{C}}-OX$$

5. As a new product a compound as defined in claim 1 in which R represents the group $$\overset{O}{\overset{\|}{C}}-OX$$

6. Process for the production of a compound of the formula

[structure]

in which R stand for a member of the group consisting of $$H\overset{CH_3}{\underset{|}{C}}-CH_2-CH_2-\overset{O}{\overset{\|}{C}}-OX; \quad H\overset{CH_3}{\underset{|}{C}}-CH_2-\overset{O}{\overset{\|}{C}}-OX;$$

$$H\overset{CH_3}{\underset{|}{C}}-\overset{O}{\overset{\|}{C}}-OX; \quad and \quad \overset{O}{\overset{\|}{C}}-OX$$

in which X stands for a member of the group consisting of hydrogen and the lower alkyl groups which comprises removing halogen acid from a compound of the formula

[structure]

by contacting a solution thereof with an aqueous solution of a base.

7. Process for the production of a compound of the formula

[structure]

which comprises removing halogen acid from a compound of the formula

[structure]

by contacting a solution thereof with an aqueous solution of a base.

8. Process as defined in claim 7, in which the removal of halogen acid is effected in the presence of chloroform and an aqeous solution of an alkali.

EDWARD C. KENDALL.

REFERENCES CITED

The following references are of record in the file of this patent:

UNITED STATES PATENTS

| Number | Name | Date |
|---|---|---|
| 2,123,127 | Wallis | July 12, 1938 |
| 2,263,785 | Reichstein | Nov. 25, 1941 |
| 2,312,344 | Logemann | Mar. 2, 1943 |
| 2,341,250 | Wallis | Feb. 8, 1944 |

FOREIGN PATENTS

| Number | Country | Date |
|---|---|---|
| 544,051 | Great Britain | Mar. 25, 1942 |

OTHER REFERENCES

Ziegler: Annalen, 551, pp. 80–119 (1942).